United States Patent [19]

Smith et al.

[11] 3,892,629

[45] July 1, 1975

[54] PROCESS FOR GROWING A FUNGUS

[75] Inventors: John Edward Smith, Bearsden; John Galloway Anderson, East Kilbride, both of Scotland

[73] Assignee: Imperial Chemical Industries Limited, London, England

[22] Filed: Feb. 5, 1973

[21] Appl. No.: 329,338

[30] Foreign Application Priority Data
Feb. 10, 1972  United Kingdom................. 6367/72

[52] U.S. Cl.................... 195/36 R; 195/79; 195/81;
195/80 R; 195/112; 195/36 P; 195/66 R
[51] Int. Cl........ C12b 1/20; C12d 9/10; C12d 1/04; C12k 1/00
[58] Field of Search ............................... 195/77–79, 195/81, 83, 102, 112, 108, 36 R

[56] References Cited
OTHER PUBLICATIONS
Perlman et al., "Fermentation Advances," Academic Press, New York, London (1969) pp. 495–500

Chem Abstracts, 73:64977p.

Chem Abstracts, 73:22452h.

*Primary Examiner*—Alvin E. Tanenholtz
*Assistant Examiner*—Thomas G. Wiseman
*Attorney, Agent, or Firm*—Cushman, Darby & Cushman

[57] ABSTRACT

A method for growing enlarged fungal spores and for producing secondary metabolites such as citric acid, cephalosporin and aphalosporin wherein a fungus is subjected during its germentation cycle to a period (preferably at least 10 hours) of growth at a temperature above its normal growth temperature. The enlarged spores produce less hyphal growth than normal spores and tend to produce conidiophores directly on the conidio. The reduction in hyphal growth facilitates the large scale production of secondary metabolites by growing fungi in fermenters.

14 Claims, No Drawings

PROCESS FOR GROWING A FUNGUS

This invention relates to an industrial process for growing a fungus and to a process for the production of a secondary metabolite, for example citric acid.

Several industrial processes are known wherein chemical substances, for example citric acid and certain antibiotics, are produced as secondary metabolites by growing fungi upon or in suitable nutrient media. Citric acid, for example, is generally produced by a batch process wherein a strain of the fungus *Aspergillus niger* is grown upon a nutrient medium comprising a sugar at a temperature between 25° and 33°C. The process may be performed by placing the nutrient medium in trays and inoculating it with fungal spores, after which a mat or mycelium of mould growth develops covering the surface of the medium. Alternatively the process may be conducted in large fermenters, the medium being agitated and aerated and the mould growth being distributed homogeneously throughout the medium.

During the normal germination cycle of a fungus such as *Aspergillus niger* in the presence of nutrients, an incubation phase, (lasting for 6 to 9 hours in the case of *Aspergillus niger*) during which the conidia swell, is followed by the growth of germ tubes. The majority of conidia produce one or two germ tubes and, following a phase of vegetative growth whose extent and duration depends upon environmental conditions, produce conidiophores, the asexual reproductive apparatus.

During the vegetative growth phase, a mat or mycelium is formed by the hyphae produced. This causes difficulties when circulatory fermenters such as that described in co-pending UK Application No. 35285/70 are used in processes involving the growth of fungi since the mycelium tends to cause blockages in the fermenter.

According to the present invention we provide an industrial process for growing a fungus upon an aqueous nutrient medium comprising a source of assimilable carbon and inorganic nutrients wherein spores of the fungus are maintained at a temperature above that at which normal hyphal growth (as hereinafter defined) occurs but below that at which the spores remain dormant, at least for a period during the incubation phase (as hereinafter defined) of their germination cycle.

Also according to the present invention we provide a process for the production of a secondary metabolite by growing a fungus upon an aqueous nutrient medium comprising a source of assimilable carbon and inorganic nutrients wherein spores of the fungus are maintained at a temperature above that at which normal hyphal growth (as hereinafter defined) occurs but below that at which the spores remain dormant, at least for a period during the incubation phase (as hereinafter defined) of their germination cycle.

Throughout this specification normal hyphal growth is to be understood to mean growth of filamentous hyphae, the majority of which, when allowed to grow to their full extent, grow to a length at least ten times the spore diameter without significant branching. Spores grown in the process of the invention produce considerably less hyphal growth than normal, substantially all the hyphae when grown to their fullest extent having a length less than ten times (particularly less than three times) the spore diameter with significant branching.

Throughout this specification the incubation phase is to be understood to mean that phase of the germination cycle of fungal spores which, under conditions for normal hyphal growth, precedes the formation of germ tubes.

The process of the invention is applicable to spore producing fungi, which may suitably belong to the classes Phycomycetes, Ascomycetes, Basidiomycetes and, particularly, *Fungi Imperfecti*. Fungi of the genera Aspergillus, Penicillium and Cephalosporium are especially useful in the process of the invention.

As examples of specific fungal species which may be grown by the process of the invention the following may be mentioned:

Penicillium species such as *Penicillium notatum, patulum*, and *griseofulvin. Zygorhyncus moellari, Gliocladium vireno, Fusarium moniliforme. Helminthosporium monoceras (Drechslera monoceras) Paecilomyces variotii Banier*.

Cephalosporium species, for example Cephalosporium sp IMI 49137.

Particularly suitable species are species of the Aspergillus genus, for example, *Asp. niger* (especially strains Van Tiegham IMI 41873, strain ATCC 11414, (described by Clark 1962; Steel, Lentz and Martin 1955 and Shu and Jackson 1947; also identified as No. A/1/233 by the Division of Applied Biology, National Research Council, Ottawa, Canada), *Asp. phoenicis* (especially strain ATCC 12847), *Asp. clavatus, Asp. itaconicus, Asp. ochraceus, Asp. oryzae*, (especially strain RCST 612) and *Asp. nidulans* (especially strain IMI 96217).

Strains of the above species have been described in the literature and are available from culture collections such as The Commonwealth Mycological Institute, Kew, Surrey, England.

The following secondary metabolites may be mentioned as examples of those which may be produced by the process of the invention:

Organic acids such as itaconic, gluconic, kojic, and, particularly, citric and amino acids such as lysine and glutamic acid.

Antibiotics such as penicillin, griseofulvin, streptomycin, aphalosporin and, particularly, cephalosporin.

Enzymes such as amyloglucosidase, $\alpha$-amylase, protease and glucose isomerase.

Plant growth stimulants such as gibberellic acid.

Anti-fungal agents such as monocerin.

The process of the invention may also be used to produce spores of edible fungi of the class Basidiomycetes which contain the intense mushroom flavour and which may be used in the production of flavouring agents. Additionally the process of the invention may be used to produce spores to be used in steroid conversions, e.g. in the manufacture of contraceptive pills. Fungal strains useful in steroid conversions include strains of the genus Cunninghamella and strains of *Aspergillus ochraceus*. Examples of steroid conversions brought about by fungal spores and fungal strains which may be used are given in *Advances in Applied Microbiology*, Vol. 10, 1968, p. 221 et seq., Published by Academic Press.

The effects of subjecting fungal spores, during their incubation phase, to temperatures greater than that at which normal hyphal growth occurs, are to increase the exogenous swelling or spherical growth of the conidia, whilst decreasing germ tube formation and vegetative growth. Germ tube formation decreases with increasing temperature until it is completely inhibited. At still higher temperatures the spores remain dormant. Conidiophores are more readily produced directly from the enlarged conidia, produced by growth at elevated temperatures, than from normally germinating conidia. At temperatures at which both increased spherical growth of the conidia and at least partial germ tube formation occur, increasing temperature produces increasing formation of conidiophores directly from conidia. However at temperatures at which complete inhibition of germ tube formation occurs, the production of conidiophores is also inhibited.

The initiation of conidiophores directly from the conidia is stimulated at higher temperatures but maturation of the conidiophores is better at lower temperatures. Spores grown at temperatures at which germ tube formation is completely inhibited (but the spore is not dormant) for a prolonged period can produce conidiophores without any vegetative growth when the temperature is thereafter lowered, for example to the level at which hyphal growth will occur during the normal germination cycle. When spores are subjected to a temperature at which they remain dormant, they germinate normally when the temperature is lowered to that at which normal hyphal growth occurs.

When a secondary metabolite is produced by the process of the invention, the spores are preferably maintained at a temperature above that at which normal hyphal growth occurs, throughout the period during which the secondary metabolite is being produced by the enlarged conidia, and the temperature is not lowered to allow any conidiophores which may form to mature. In particular it is preferred that the spores are maintained at a temperature at which conidiophore production is inhibited during the production of the secondary metabolite. The secondary metabolite may be produced by a batch process or by a continuous process in which enlarged spores are fed to the fermenter to replace those which have ceased to produce secondary metabolite.

In some cases it may be advantageous to produce secondary metabolites by reducing the temperature to, for example, 30° after enlarged conidia have been produced by earlier incubation at an elevated temperature. In such cases it is desirable to further limit or prevent hyphal development using known inhibiting methods. It has been found that after prolonged incubation (e.g. about 48 hrs) at temperatures such as 41°–44° almost all of the enlarged conidia do not produce germ tubes when the temperature is reduced. However mycelial growth may still occur from the small proportion of conidia in which germ tube formation has not been inhibited. Suitable methods of inhibition include addition of inhibitors such as 5-hydroxymethyl furfuraldehyde (HMF) or phenethyl alcohol (PEA) to the culture medium when the temperature is reduced, or transferring the enlarged conidia to a medium which has previously supported extensive mycelial growth or to one lacking a nitrogen source. When HMF is added as an inhibitor it is preferably added at concentrations above 40mM, preferably 50–60 mM. When PEA is added the concentration is preferably above 20mM, especially 20–40 mM.

When it is desired to produce conidiophores and subsequently conidiospores, the process of the invention is preferably conducted by subjecting the spores to a temperature above that at which normal hyphal growth occurs during the incubation phase, to encourage the formation of enlarged conidia and to inhibit vegetative growth, and thereafter reducing the temperature to a value within the range at which normal hyphal growth occurs, to enable conidiophores produced directly from the conidia to mature. The conidiospores produced are normal (ie. form germ tubes and hyphae) unless they are themselves subjected to temperatures above that at which normal hyphal growth occurs.

The process of the invention enables large numbers of spores to be produced very simply by growing spores at an elevated temperature and then lowering the temperature to enable conidiospores to be produced. The conidiospores may then be used if desired to inoculate a fermentation carried out under normal growth conditions.

The temperature at which normal hyphal growth occurs depends upon the strain of fungus employed. Preferably during the incubation phase the spores are subjected for a period to a temperature at least 2°C, above that at which normal hyphal growth occurs, particularly 2 to 12°C and especially 3°–6° above. For many strains of fungi, e.g. Aspergillus niger strains such as *Aspergillus niger* van Tieghem (IMI 41873), normal hyphal growth occurs at temperatures within the range 25° to 38°C particularly about 30° to 35°C and the spores remain dormant at temperatures above 46°C. For these and similar strains the preferred elevated temperature is within the range 41° to 45°C, particularly 42° to 44°C. The preferred elevated temperature range may differ from this in certain cases, for example it may extend up to 46° or even 48° with some strains. Preferably, if it is desired to produce conidiophores and subsequently conidiospores, spores of these strains are maintained for a period at the elevated temperature and the temperature is then lowered to between 25° and 35°C particularly to about 30°C to allow the conidiophores to mature. For Cephalosporium strains (e.g. str. IMI 49137) normal growth occurs at temperatures within the range 25° to 28°C and particularly suitable temperatures for producing enlarged spores are within the range 37.5° to 39°.

For conidiophore production the optimum period for which the spores are held at the elevated temperature depends upon the strain of fungus employed and upon the elevated temperature. Generally, however, the period is at least 10 hours, preferably at least 48 hours. For secondary metabolite production the spores are preferably held at the elevated temperature, particularly at 44°C, in the case of *Aspergillus niger*, throughout the process.

The extent to which germ tubes are formed by the enlarged conidia is affected by the conidial density in the medium. At higher conidial densities, e.g. $15 \times 10^6$ conidia/ml medium and above, germ tube formation is inhibited. Thus if it is desired to inhibit germ tube formation during secondary metabolite production the conidial density is preferably $15 \times 10^6$/ml or above, e.g. $15-80 \times 10^6$/ml especially $15-25 \times 10^6$/ml. When the conidial density is increased in this way lower temperatures, e.g. 41°–42°, in the preferred range may be used when the enlarged conidia are produced enabling enlargement to take place more rapidly.

Suitable sources of assimilable carbon will depend upon the strain of fungus employed or upon the secondary metabolite to be produced. Suitable sources in many instances include glucose and sucrose.

The preferred constitution of the culture medium will vary depending upon the fungus and the secondary metabolite to be produced. In the case of growth of *Aspergillus niger* to produce citric acid the culture medium suitably comprises the following constituents at the following concentrations:

The source of assimilable carbon is preferably present in the nutrient medium in proportions between 1 to 14%, especially 10 to 14%.

The inorganic nutrients present in the nutrient medium preferably include inorganic sources of elements such as potassium, nitrogen, phosphorus, sulphur and magnesium. These elements may be included in the medium by adding thereto compounds such as potassium chloride, magnesium sulphate, potassium phosphate, phosphoric acid, ammonia, urea, ammonium salts e.g. $(NH_4)_2SO_4$ and nitrates e.g. $KNO_3$. It is preferred that the inorganic compounds containing these elements are added to the medium in amounts sufficient to provide the following percent concentrations (w/v):

| | |
|---|---|
| N: | 0.04–0.045 |
| $K^+$: | 0.025–0.035 |
| $Mg^{2+}$: | 0.002–0.003 |
| $PO_4^{3-}$: | 0.065–0.075 |
| $SO_4^{2-}$: | 0.014–0.015 |

The nutrient medium may also contain trace amounts of ions of other metallic elements such as calcium, copper, iron, cobalt, manganese and sodium (which may be added as chlorides or sulphates), preferably in amounts which provide weight percent ion concentrations between $6 \times 10^{-6}$ and $2 \times 10^{-4}$ % w/v. The medium may also comprise organic nutrients other than the principal source of assimilable carbon. For sporulation but not for giant spore production it is desirable to include some form of organic nitrogen. Additional organic nutrients include glutamate (suitably added as glutamic acid monosodium salt) which has the effect of increasing the number of conidia forming conidiophores and alanine which appears to be required for germination of some strains of *Aspergillus niger*. A very suitable medium for use in cephalosporin production is Czapek Dox medium.

The pH of the medium is suitably adjusted to a value within the range 2 to 6, especially 3 to 4.5, for example by addition of HCl or NaOH, in many cases.

The invention provides a means for growing fungi having considerably enlarged conidia and with little or no hyphal growth and consequent mycelium formation. This will facilitate the use of circulatory fermenters such as that described in co-pending UK Application No. 35285/70 in processes involving the growth of fungi.

The invention is illustrated by the following Examples:

EXAMPLE 1

Growth of Aspergillus niger van Tieghem (IMI 41873) at elevated temperatures

Stock cultures of the fungus were maintained on potato-glucose-agar slopes at 27°C. Spores were harvested from 4 day cultures and the spore suspension was filtered and then washed twice in sterile deionised water by centrifuging at 3000× g for 10 minutes. The spores were finally suspended in sterile deionised water, shaken and counted in a haemocytometer.

The growth of the fungus in the following culture medium was studied at 30°, 35°, 38°, 41°, 44° and 47°C:

Culture medium 1l deionised water containing: 10 g glucose: 5 g glutamic acid (monosodium salt) : 1 g $KH_2PO_4$: 0.25 g $MgSO_4.7H_2O$:0.234 mg $CuSO_4.8H_2O$:6.32 mg $FeSO_4.7H_2O$: 1.1 mg $ZnSO_4.7H_2O$: 3.5 mg $MnCl_2.4H_2O$: 46.7 mg $CaCl_2$ : 1.98 g$(NH_4)_2SO_4$: adjusted with HCl to pH 4.5. The medium was dispensed in 5 ml volumes into glass tubes (150 × 24 mm). All cultures were inoculated to contain $1 \times 10^6$ spores per ml of medium.

Microscopic observations were made as follows on freshly prepared samples or on samples stored in 4% formaldehyde at 4°C:

Proportion of spores showing spherical growth was assessed by examining 100 spores per sample.

Germ tube production was assessed by examining 100 spores per sample, production being scored if the germ tube was as long as it was broad.

Spore diameters were assessed by measuring 50 spores per sample using a microscope fitted with an ocular micrometer.

Conidiophore production from conidia was assessed by direct counting of 100 conidia per sample, production being scored if the conidiophore was as long as it was broad. The counts included both immature (conidiophore stalk) and mature (stalk with vesicle, phialides and conidia) structures.

Of the temperatures tested, the most rapid rate of spherical growth was obtained at 38°C followed in order by 41°, 35°, 44° and 30°C. No spherical growth occurred at 47°C. At temperatures within the range 35° to 44°C the eventual spore size was similar (about 20 $\mu$) although the time taken to reach this size varied according to the spherical growth rate. Maximum spore size at 38°C was reached after 24 hrs, whereas at 44°C about 48 hrs. was required. A comparison of spore diameter, spore surface and spore volume of unswollen spores with spherical growth spores produced after 48 hrs cultivation at 44°C is given in Table 1.

The proportion of spores forming germ tubes and the time of germ tube formation varied according to the incubation temperature. At 30°, 35° and 38°C some spores had formed germ tubes by 6 hrs, although the majority were produced between 6 and 9 hrs and by 12 hrs 97 to 99% of the spores had formed germ tubes. At 41°C there was a loss of synchrony in germ tube formation and the proportion of spores producing germ tubes decreased. At 44°C germ tube formation was completely inhibited.

The morphology of the germ tubes produced was affected by incubation temperature. At 30°C the germ tubes were thin and had few branches whereas at higher temperatures the larger spores produced thick branching germ tubes. The net result was a rapidly growing culture at 30°C., a slowly growing culture at 41°C consisting of a mixture of large spherically grown spores with and without germ tubes, and minimal growth at 44°C where the culture consisted entirely of large spherically grown spores without germ tubes.

When growth took place for periods in excess of 24 hrs., conidiophore stalks formed directly from the conidia were observed more frequently at the elevated temperatures than at 30°C. At temperatures (35°, 38° and 41°C) which allowed both swelling and at least partial germ tube formation, higher temperatures resulted in greater conidiophore production from the enlarged conidia. At 44°C no conidiophores were produced. The formation of vesicles and phialides occurred better at 35° and 38° than at 41°C. At 41°C although conidiophores reached normal lengths most were unable to differentiate the final stages of the reproductive structure, resulting in aberrant tips.

Experiments were carried out in which spores were grown for various periods at temperatures of 35°, 38°, 41°, 44° and 47°C followed by a period of growth at 30°C. The results obtained are set out in Table 2. An initial incubation at temperatures of 35° to 44°C increased the number of conidiophores which developed at 30°C. At 47° no swelling occurred and no increase over the control (30°C) value was obtained when these conidia germinated at 30°C. After 48 hrs at 44°C almost all the conidia did not produce germ tubes at 30°C but did produce conidiophores.

TABLE 1

|  | Spore Diameter ($\mu$) | Spore surface area ($\mu^2$) | Spore volume ($\mu^3$) |
|---|---|---|---|
| Unswollen spores A | 3.5 | 38.5 | 22.4 |
| Large spherical growth spores B. | 19.6 | 1207 | 3933 |
| Ratio B/A | 5.6 | 31.4 | 175.6 |

TABLE 2

| Initial Temperature | Time at [1] initial temperature (hrs). | Percentage of conidia producing conidiophores | | | | |
|---|---|---|---|---|---|---|
|  |  | 5 | 10 | 15 | 20 | 40[2] |
| 30 |  | 33 | 30 | 37 | 32 | 35 |
| 35 |  | 36 | 51 | 58 | 48 | 52 |
| 38 |  | 44 | 66 | 59 | 63 | 61 |
| 41 |  | 38 | 88 | 95 | 90 | 78 |
| 44 |  | 31 | 59 | 61 | 74 | 0 |
| 47 |  | 36 | 34 | 29 | 31 | 0 |

[1] Following incubation at the initial temperature for the time stated conidia were grown at 30°C for 24 hrs.
[2] Conidia grown at the initial temperature for 40 hrs were not grown thereafter at a lower temperature.

EXAMPLE 2

The production of enlarged spores and conidiophores by the following organisms was investigated:- Asp. niger (ATCC 11414) : Asp. phoenicis (ATCC 12847)

Cultural conditions

The culture medium and cultural conditions were the same as in Example 1.

Microscopic examination

All examinations were made on freshly prepared samples. Spore diameters were measured using a microscope fitted with an image-shearing eyepiece and 40 spores per sample were measured.

Secondary spore production

The conditions required to produce conidiophores from enlarged spherically grown spores varied depending upon the organism. The results obtained with the individual organisms are described below and are summarised in Table 3.

A niger (ATCC 11414)

Cultures were incubated for 48 hrs. at temperatures of 44°, 45° and 46°C. All cultures consisted of enlarged spherically grown spores after 48 hrs, no mycelial growth being apparent. A comparison of spore diameter of unswollen spores with spherically grown spores in these cultures is given in Table 4.

On transfering the cultures to a temperature of 30°, cultures initially grown at 45° and 46° produced both mycelium and conidiophores after 24 hrs. at 30°. A greater proportion of conidiophores were produced by the cultures initially incubated at 45° than from those initially incubated at 46°.

Further cultures were incubated at 45° for 96 hrs. followed by incubation for 24 hrs. at 30°. After growth at 45° the cultures consisted of spherically grown spores with no mycelial growth. After incubation at 30° conidiophores were produced together with short, highly septate branched hyphae about 30–40 $\mu$ long. This hyphal growth was restricted in length and ceased to appear when cultures were incubated at 30° for periods in excess of 24 hrs. On maintainance of incubation for a further 48 hrs, the culture consisted of small clumps (0.5–1.0 mm in diameter) of spherically grown spores with and without hyphae and/or conidiophores. Most of the hyphae produced one or two phialides at their tips and these appeared to produce spores in addition to those produced by the conidiophores. Numbers of secondary spores were visible in the medium and also trapped in clumps of mycelium.

A suspension of secondary spores was prepared by filtration through sterile gauze giving a suspension of 5 × 10⁵ secondary spores per ml. Probably the number of secondary spores produced was greater than this figure indicates but that a large number were not recovered having become trapped in clumps of mycelium.

A phoenicis (ATCC 12847)

Cultures were incubated for 48 hrs. at temperatures of 44° and 45° respectively. The cultures consisted of enlarged spherically grown spores after 48 hrs., no mycelial growth being apparent. A comparison of spore diameter of unswollen spores with spherically grown spores in these cultures is given in Table 4.

The cultures originally incubated at 44° were transferred to a temperature of 30°. At this temperature the spores produced only conidiophores. Most of the conidiophores produced phialides after 15 hrs. at 30° and were fully mature after 24 hrs. At this stage large numbers of secondary spores were observed in the medium. In this case over 90% of the spherically grown spores produced one or more conidiophores.

TABLE 3

| Strain | Initial Incubation 20°C | | Final Incubation 20°C | | Hyphal Growth | Conidiophores |
|---|---|---|---|---|---|---|
| ATCC 11414 | 45 | 48 hrs | 30 | 24 hrs | ** | * |
|  | 46 | 48 hrs | 30 | 24 hrs | *** | * |
|  | 45 | 96 hrs | 30 | 72 hrs | * | * |
| ATCC 12847 | 44 | 48 hrs | 30 | 24 hrs | NIL | *** |

In Table 3 the estimated extent of hyphal growth and conidiophore production is indicated by the number of asterisks, three asterisks indicating the greatest extent.

In Table 3 the estimated extent of hyphal growth and conidiophore production is indicated by the number of asterisks, three asterisks indicating the greatest extent.

TABLE 4

| Strain | Temperature °C | Spore diameter of enlarged spores after incubation for various periods at given elevated temperatures ($\mu$) | | | Spore Diameter of unswollen spores ($\mu$) |
|---|---|---|---|---|---|
| | | 24 hrs | 48 hrs | 96 hrs | |
| ATCC 11414 | 44 | 9.0 | 16.4 | 19.2 | 3.6 |
| | 45 | 8.2 | 11.4 | 13.4 | |
| | 46 | 7.7 | 8.4 | 8.9 | |
| ATCC 12847 | 44 | 11.7 | 17.6 | | 4.3 |
| | 45 | 8.6 | 25.1 | | |

EXAMPLE 3

Effect of varying spore densities on growth of A. niger (ATCC 11414)

The experiment was carried out using the following culture medium (Medium A):

In 1 L. distilled water : sucrose - 140.0g : $NH_4NO_3$ - 2.5 g : $KH_2PO_4$ - 1.0 g : $MgSO_4.7H_2O$ - 0.25 g : $FeCl_3.6H_2O$-6.27mg : $ZnSO_4.7H_2O$-2.2 mg. pH adjusted to 3.1 with HCl.

Conidia for inoculation of medium A were produced on Medium B which contained the same constituents with the exception of $FeCl_3.6H_2O$ and $ZnSO_4.7H_2O$. The pH of medium B was adjusted to 5 to 5.5 and the medium was solidified with 2% agar. Microscopic observations were made as in Example 1. Washed conidia were added to Medium A at the various conidial densities in the range $1 \times 10^6$/ml. to $80 \times 10^6$/ml. The various cultures produced were incubated with agitation at 41°. At all conidial densities about 60% of the conidia increased in diameter to 15 to 20 $\mu$m after 24 hrs. incubation.

Conidial density had a marked effect on germ tube formation. After 16 hrs. incubation at 41° in the $1 \times 10^6$ conidia/ml culture many enlarged conidia had produced germ tubes whereas at this time germ tube formation was inhibited from the enlarged conidia in the higher conidial density cultures, ie. densities of $15 \times 10^6$/ml and above.

EXAMPLE 4

Media A and B and the organism were as described in Example 3. Microscopic measurements were made as described in Example 1.

Cultures having conidial densities of $1 \times 10^6$ conidia/ml and $15 \times 10^6$ conidia/ml respectively were grown at the following temperatures 38°, 41°, 42°, and 44°C.

In the $1 \times 10^6$ conidia/ml cultures germ tubes appeared before 16 hrs. at all temperatures below 44°. At 44° germ tubes were not produced even after 96 hrs. incubation.

In the $15 \times 10^6$ conidia/ml cultures germ tubes appeared before 16 hrs. at 38°, after 18 hrs. at 41°, after 22 hrs. at 42° and failed to appear after 96 hrs at 44°. No conidiophores were produced from the conidia in these cultures.

EXAMPLE 5

Media A and B and the organism were as described in Example 3. Microscopic measurements were made as described in Example 1.

Cultures of the organism were grown at 41° and 42°C respectively for 16 hrs and 20 hrs respectively. The temperature was then raised to 44° in both cases and the cultures were maintained at that temperature for 96 hrs without germ tube formation occuring.

EXAMPLE 6

The strain of Aspergillus niger used was ATCC 11414.

The culture medium used contained the following constituents in 1 L distilled water :- 10 gms sucrose; 1 gm $KH_2PO_4$; 0.25 gms $MgSO_4.7H_2O$; 2.5 gms $NH_4NO_3$; 2.21 mgs $ZnSO_4.7H_2O$; 6.2 mgs $FeCl_3.6H_2O$ and 2.2 gms pyruvic acid/monosodium salt). The initial pH was adjusted to 4.5 by addition of HCl.

Washed conidia at a density of $4 \times 10^6$/ml were agitated in the culture medium at 44°C for 48 hrs. During this period enlargement of the conidia occurred in the absence of hyphal development. At the end of the period an additional 130 gms sucrose was added to the culture medium. After a further period of 48 hrs. at 44°C, citric acid was detected in the culture medium at a concentration of 800 ug/ml.

EXAMPLE 7

The organism used was the same as in Examples 3 to 6. The culture medium was medium A described in Example 3.

Washed conidia at a density of $15 \times 10^6$/ml were agitated in the culture medium at 42° for 22 hrs. During this period enlargement of the conidia occurred in the absence of hyphal development. At the end of the period citric acid was detected in the culture medium at a concentration of 4.5 mg/ml.

EXAMPLE 8

The organism used was the same as in Examples 3 to 7. The culture medium was medium A.

Conidia at a density of $15 \times 10^6$/ml medium were incubated at 41° for 16 hrs. The culture medium was then divided into 7 parts to each of which differing amounts of 5-hydroxy methyl furfuraldehyde (HMF) were added to give cultures containing the following concentrations of HMF - 10, 20, 30, 40, 50, 60 and 80mM respectively. These cultures were maintained at 30° for 96 hrs. At concentrations of HMF between 10mM and 40mM germ tube formation and slow hyphal growth occurred. At concentrations of HMF above 40 mM no germ tube formation occurred.

In one test incubation of the enlarged conidia at 30° in the presence of 50mM HMF was prolonged for 6 days. The conidia were then washed and returned to fresh medium A. Germ tube formation and hyphal growth then occurred when incubation at 30° was continued showing that enlarged conidia remain viable in contact with inhibitor concentrations which prevent hyphal development.

EXAMPLE 9

Example 8 was repeated using phenethyl alcohol (PEA) as the inhibitor. The concentrations of PEA studied were 15, 18, 20, 40, 60, 80, and 100mM respectively. At concentrations of PEA up to 18mM the enlarged conidia produced germ tubes and hyphal development at 30°. At PEA concentrations of 20mM and above no germ tubes were produced. A test (as described in Example 8) showed that enlarged conidia remain viable in the presence of 20 mM PEA for 16 days.

EXAMPLE 10

The organism used was the same as in Examples 3 to 9. The culture medium was medium A.

Conidia at a density of $15 \times 10^6$/ml medium were incubated at 41° for 16 hrs. The culture medium was then divided into two parts 1 and 2. Part 1 was transferred to a filtrate of medium A which had previously supported extensive mycelial growth. Part 2 was transferred to medium A lacking $NH_4NO_3$ (i.e. a nitrogen source). In both parts 1 and 2 the enlarged conidia either produced no mycelium or only limited mycelium after growth for 96 hrs. at 30°.

EXAMPLE 11

Medium:

The medium used consisted of:

| | |
|---|---|
| sugar beet molasses | 300 gm/L |
| $KH_2PO_4$ | 0.1 gm/L |
| $Na_4Fe(CN)_6$ | 1 gm/L |

Run 1:

Subaerial spores, prepared as in Example 1 were inoculated into 2 litres of the above medium at a level of $10^4$ spores/ml., (ATCC 11414).

Incubation was carried out in a stirred, baffled fermenter for 48 hrs., when all but 400 ml. of the fermentation broth was removed, and the volume made up with fresh medium to a volume of 5 litres.

After a further 5 days of incubation, the culture was found to contain 21.5 gm/L dry weight of mycelium and 0.3% citric acid.

Run 2:

Run 1 was repeated using secondary spores produced by microcycle conidiation.

After the same period of time, the culture was found to contain 25 gm/L dry weight of mycelium and 0.3% citric acid.

EXAMPLE 12

The growth of cultures of *Cephalosporium sp.* IMI 49137 in Czapek Dox medium was studied at various temperatures. The normal temperature for growth of this organism is 25° to 28°C. Enlarged spores were produced in cultures grown at temperatures within the range 37.5° to 39°C. A substance containing cephalosporin and exhibiting antibiotic activity was produced by normally grown spores at temperatures between 25° and 28°C and by the enlarged spores at 37.5° to 39°C.

We claim:

1. In an industrial process for growing a fungus belonging to a genus selected from the group consisting of Aspergillus, Penicillium, Cephalosporium, Zygorhyncus, Gliocladium, Fusarium, Helminthosporium, Paecilomyces and Cunninghamella upon an aqueous nutrient medium comprising a source of assimilable carbon and inorganic nutrients, the improvement which comprises the step of maintaining spores of the fungus at a temperature above that at which normal hyphal growth occurs but below that at which the spores remain dormant for a period of at least 10 hours during the incubation phase of their germination cycle thereby producing enlarged spores which produce less hyphal growth than normal spores.

2. A process according to claim 1, wherein the fungus belongs to a genus selected from the group consisting of Aspergillus, Penicillium and Cephalosporium.

3. A process according to claim 2 wherein the fungus is a strain selected from the group consisting of *Aspergillus niger* strains IMI 41873 and ATCC 11414, *Aspergillus phoenicis* strain ATCC 12847 and *Cephalosporium sp.* strain IMI 49137.

4. A process according to claim 1 wherein the spores are maintained for at least 10 hours at a temperature 2° to 12°C above that at which normal hyphal growth occurs.

5. A process according to claim 1 wherein after spores of the fungus have been maintained for at least 10 hours at a temperature above that at which normal hyphal growth occurs, the temperature is reduced to a value within the range at which hyphal growth will occur during the normal germination cycle.

6. A process according to claim 1 wherein a secondary metabolite is produced by the fungal spores.

7. A process according to claim 6 wherein the secondary metabolite is selected from the group consisting of citric acid, cephalosporin and aphalosporin.

8. A process according to claim 7 wherein the secondary metabolite is citric acid and the fungus is a strain of the species *Aspergillus niger*.

9. A process according to claim 7 wherein the secondary metabolite is cephalosporin and the fungus is *Cephalosporium sp.* strain IMI 49137.

10. A process according to claim 6 wherein the spores are maintained at a temperature above that at which normal hyphal growth occurs throughout the period during which the secondary metabolite is being produced.

11. A process according to claim 6 wherein, after at least 10 hours of growth at a temperature above that at which normal hyphal growth occurs, the secondary metabolite is produced at a temperature within the range at which normal hyphal growth will occur during the normal germination cycle.

12. A process according to claim 11 wherein the spores are subjected to a method for inhibiting hyphal growth whilst the secondary metabolite is being produced.

13. A process according to claim 8 wherein the spores are maintained for at least 10 hours at a temperature within the range 41° to 45°C and thereafter the temperature is reduced to a value within the range 25° to 35°C.

14. A process according to claim 6 wherein the density of the spores in the medium is within the range $15 \times 10^6$ to $80 \times 10^6$ spores/ml of medium.

* * * * *